United States Patent [19]

Okada et al.

[11] Patent Number: 4,837,757

[45] Date of Patent: Jun. 6, 1989

[54] OPTICAL RECORDING/REPRODUCING DEVICE

[75] Inventors: Hiroo Okada, Ina; Yoshiaki Ikeda; Ken Ohsima, both of Hachioji, all of Japan

[73] Assignee: Olympus Optical Co., Ltd., Tokyo, Japan

[21] Appl. No.: 891,257

[22] Filed: Jul. 28, 1986

[30] Foreign Application Priority Data

Aug. 3, 1985 [JP] Japan .................. 60-171424

[51] Int. Cl.$^4$ .............................................. G11B 7/00
[52] U.S. Cl. ..................................... 369/44; 369/32; 369/43; 369/111
[58] Field of Search ................. 369/32, 33, 44, 45, 369/54, 56, 30; 358/342, 343, 907, 908

[56] References Cited

U.S. PATENT DOCUMENTS

| | | | |
|---|---|---|---|
| 4,539,664 | 9/1985 | Deguchi et al. | 369/32 |
| 4,598,395 | 7/1986 | Smith | 369/32 |
| 4,615,023 | 9/1986 | Inada et al. | 369/32 |
| 4,667,315 | 5/1987 | Fujii et al. | 369/32 |

FOREIGN PATENT DOCUMENTS

| | | |
|---|---|---|
| 0090379 | 10/1983 | European Pat. Off. . |
| 3227654 | 2/1983 | Fed. Rep. of Germany . |
| 3619515 | 12/1986 | Fed. Rep. of Germany . |
| 57-94940 | 6/1982 | Japan . |

OTHER PUBLICATIONS

Principles of Optical Disc Systems, Publisher: Adam Hilger Ltd 1985, pp. 144–157 and 174–177.

Primary Examiner—William M. Shoop, Jr.
Assistant Examiner—Brian K. Young
Attorney, Agent, or Firm—Frishauf, Holtz, Goodman & Woodward

[57] ABSTRACT

An optical pickup is provided below an optical disk. A laser beam is emitted from a semiconductor laser onto a track, through an objective lens. The objective lens is capable of shifting, and is shifted in the direction of the track width by a magnetic force from a tracking actuator, thereby performing lens tracking. The optical pickup is mounted on a carriage. The carriage is shifted along the radial direction of the optical disk by a voice coil motor. This shifts the laser beam along the radial direction of the optical disk, thereby performing track access. Upon reception of an access command, a velocity control mode commences, and the shift velocity of the carriage is controlled in accordance with a velocity control signal corresponding to the distance between a target track and a current track. When the pickup arrives near the target track, the generation of velocity control signal ceases and the location control mode commences. When the carriage is deviated from the target track, its servo is adjusted in accordance with its deviation, by a location control signal. During velocity control of the carriage, a lens damping signal corresponding to the velocity control signal is supplied to the objective lens. After location control of the carriage commences, the lens damping signal corresponding to a location cotnrol signal is supplied to the objective lens until the velocity of the carriage falls below a predetermined value.

10 Claims, 3 Drawing Sheets

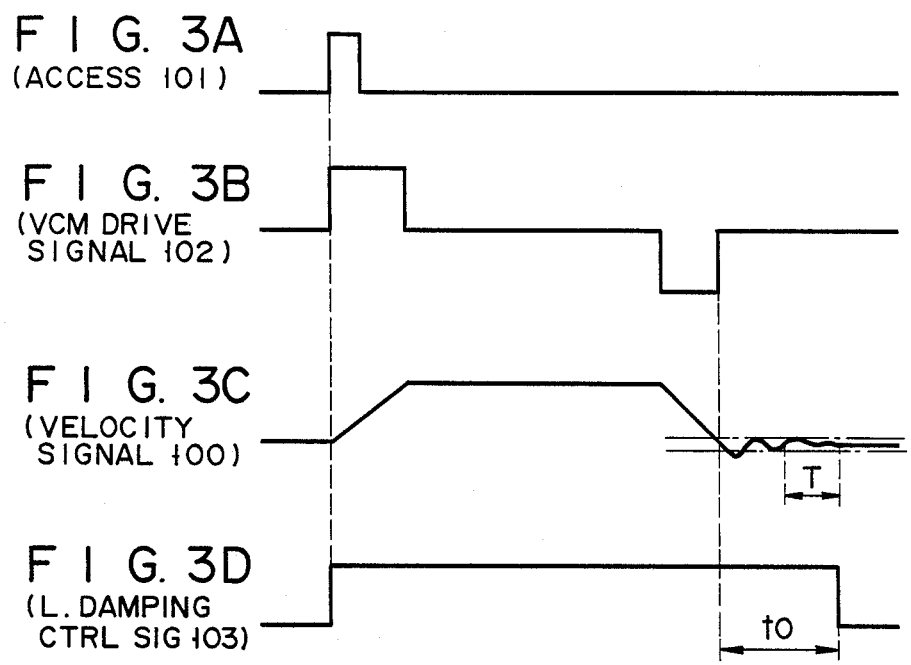
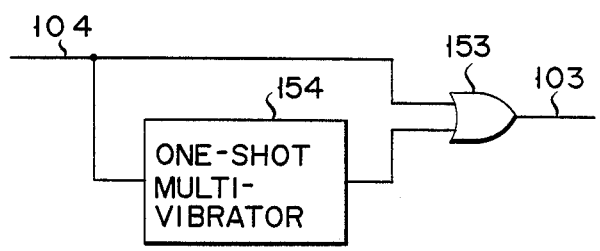

OPTICAL RECORDING/REPRODUCING DEVICE

BACKGROUND OF THE INVENTION

The present invention relates to an optical recording-/reproducing device for recording/reproducing data in/from an optical disk or a magneto-optical disk utilizing a light beam and, more particularly, to access control thereof.

Generally, concentric or helical data recording tracks (to be referred to as tracks hereinafter) are formed on a disk-shaped recording medium such as an optical disk. During recording/reproduction, a laser beam is tracking-controlled so as to irradiate the tracks correctly. Tracking control is performed by moving an objective lens in an optical pickup, and is called lens tracking. The optical lens is held by a leaf spring or the like, which is capable of shifting, and is shifted by a shifting means such as a combination of a tracking coil and a magnet.

When data is to be recorded in or reproduced from a track other than the track currently being subjected to data recording/reproducing, access control is performed to move a carriage to the target track. The tracking actuator for the objective lens is not controlled during access control. Therefore, since the objective lens is freely movable, it is influenced by the accelerative force applied to the carriage during access, is shifted from its mechanical center and vibrates. This unnecessary vibration makes proper access difficult.

In order to solve this problem, an optical disk device is disclosed in Japanese Patent Disclosure (Kokai) No. 57-94940. According to the first embodiment of this disclosed invention, a current flowing through a voice coil of a carriage-moving voice coil motor is detected, and a corresponding control signal is supplied to a lens-tracking mechanism, thereby preventing lens vibration. Therefore, when the access period ends and current supply to the voice coil motor ceases, a control signal supplied to the lens-tracking mechanism is disabled. Then, the lens vibration, which could not be attenuated, remains and cannot be stopped immediately after the carriage is stopped. According to the second embodiment of the above invention, the vibration of the objective lens is detected by a strain gauge, and the output signal from the strain gauge is supplied to a lens tracking mechanism as a control signal, in order to prevent it. With the second embodiment, however, since the strain gauge is mounted on the leaf spring supporting the objective lens, the vibration characteristic of the leaf spring is affected. Therefore, the frequency characteristic of the lens-tracking control is degraded.

SUMMARY OF THE INVENTION

It is an object of the present invention to provide an optical recording/reproducing device which can move a head to a desired track quickly and accurately, in response to an access command.

It is another object of the present invention to provide an optical recording/reproducing device which can suppress vibration of an objective lens, which is caused by the accelerative force of a carriage during access movement, and which can quickly stabilize access movement of the carriage.

An optical recording/reproducing device according to the present invention comprises a pickup having a laser light source, a lens capable of shifting and irradiating an optical disk with a laser beam from the laser light source, and a lens actuator for moving the optical axis of the lens and tracking the optical disk with the laser beam, an access mechanism for moving the pickup in the radial direction of the optical disk in response to an access command and for locating the pickup on a predetermined track on the optical disk, and a lens damping circuit for supplying, to the lens actuator, a lens damping signal which attenuates vibration of the lens caused by a force acting thereon in accordance with acceleration of the pickup, the lens damping signal being supplied during shifting of the pickup and during a predetermined period of time after shifting of the pickup.

BRIEF DESCRIPTION OF THE DRAWINGS

FIGS. 3A to 3D are signal waveform charts for explaining the operation of the first embodiment; and FIG. 4 shows a modification of the lens damping control signal generator of the first embodiment.

DETAILED DESCRIPTION OF THE PREFERRED EMBODIMENT

Figure 1:
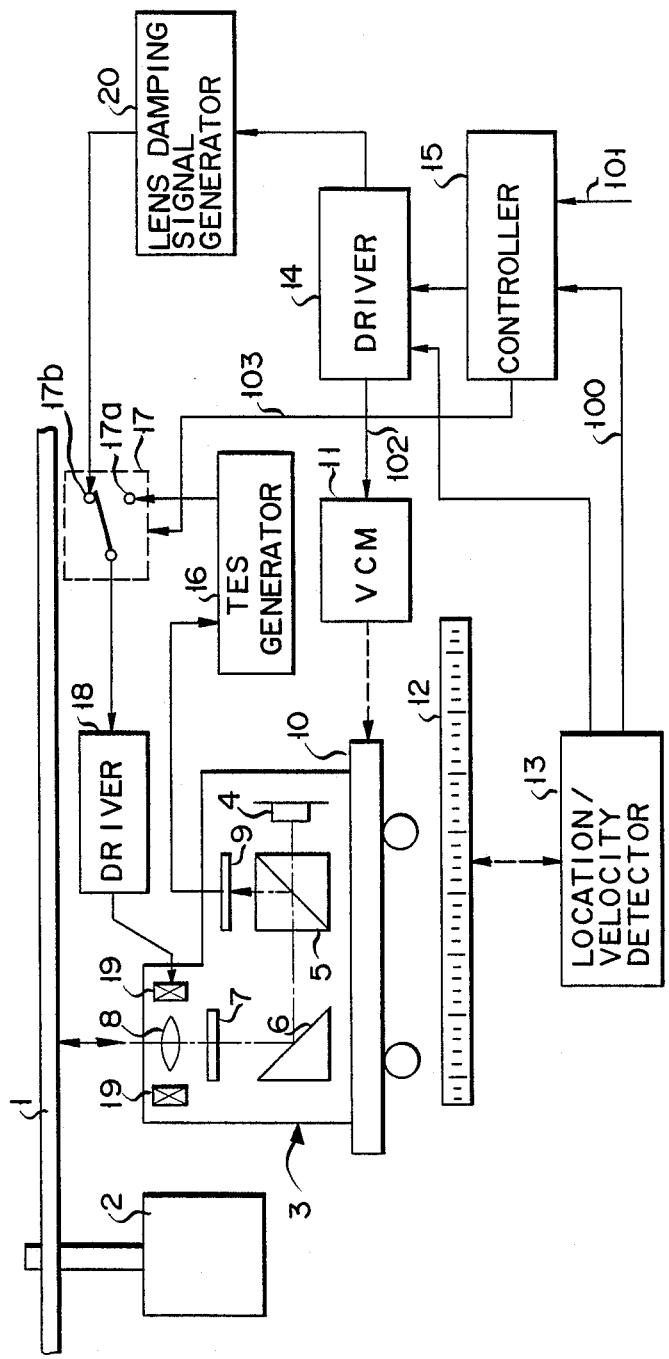
FIG. 1 is a block diagram of an optical recording/reproducing device according to an embodiment of the present invention.

An optical recording/reproducing device according to an embodiment of the present invention will now be described with reference to the accompanying drawings. FIG. 1 is a block diagram of part of the first embodiment which is associated with tracking/access control.

Optical disk (or magneto-optical disk) 1, as a data recording medium, is rotated by spindle motor 2 at a predetermined rotational frequency. The data recording surface of disk 1 faces downward, and optical pickup 3 is provided under disk 1. When an magneto-optical disk is used as the data recording medium, a magnetic field generating coil (not shown) is provided at the position above the disk which corresponds to optical pickup 3.

Optical pickup 3 comprises semiconductor laser 4, polarizing beam splitter 5, mirror 6, λ/4 plate 7, objective lens 8, photodetector 9, and tracking actuator 19. The laser beam emitted from semiconductor laser 4 irradiates the track on disk 1 through beam splitter 5, mirror 6, λ/4 plate 7, and objective lens 8. The beam reflected by the track travels in the opposite direction to the optical path of the emitted beam. The optical path of the reflected beam is then bent through 90° by beam splitter 5, and the beam is incident on detector 9 having two to four detection regions. Detector 9 outputs a difference signal, representing the differences in level between its respective detection regions. Objective lens 8 is held by a leaf spring or the like (not shown), to permit shifting. Lens 8 is shifted in the direction of the track width by the magnetic force of tracking actuator 19, and the optical axis of the laser beam is shifted in the direction of the track width, thereby performing lens tracking.

Optical pickup 3 itself is mounted on carriage 10. Carriage 10 is shifted in the radial direction of disk 1 by voice coil motor (VCM) 11, thereby performing track access.

Scale (optical scale in this embodiment) 12 is provided on carriage 10 in order to detect its degree of shift. Scale 12 has a grating pattern of a predetermined pitch. Location/velocity detector 13 detects the location/velocity of scale 12 by detecting its grating pattern. Detector 13 outputs, as a location signal, a sine wave signal corresponding to the detected grating pattern. The location signal has a constant period while carriage 10 shifts at a constant speed. When the shift velocity of carriage 10 changes, the period of the location signal changes. When carriage 10 stops, generation of the location signal ceases. When the location signal is differentiated within detector 13, a velocity signal is obtained.

The location signal output from detector 13 is supplied to VCM driver 14. Velocity signal 100, output from detector 13, is supplied to controller 15. Velocity signal 100 is also supplied to driver 14 from controller 15. Access command 101 is supplied to controller 15 from a host computer.

The output from photodetector 9 is supplied to tracking error signal (TES) generator 16 to obtain a tracking error signal representing an error in the position of the laser beam in relation to the target track. The tracking error signal is supplied to first terminal 17a of selector 17. An output from lens damping signal generator 20 is supplied to second terminal 17b of selector 17. A control signal is supplied to generator 20 from driver 14. The lens damping signal will be described later.

Selector 17 is switched in accordance with lens damping control signal 103 from controller 15. More particularly, lens 8 is lens-tracked by the tracking error signal while selector 17 is switched to the first terminal 17a, and is damping-controlled by the lens damping signal while selector 17 is switched to the second terminal 17b.

Figure 2:
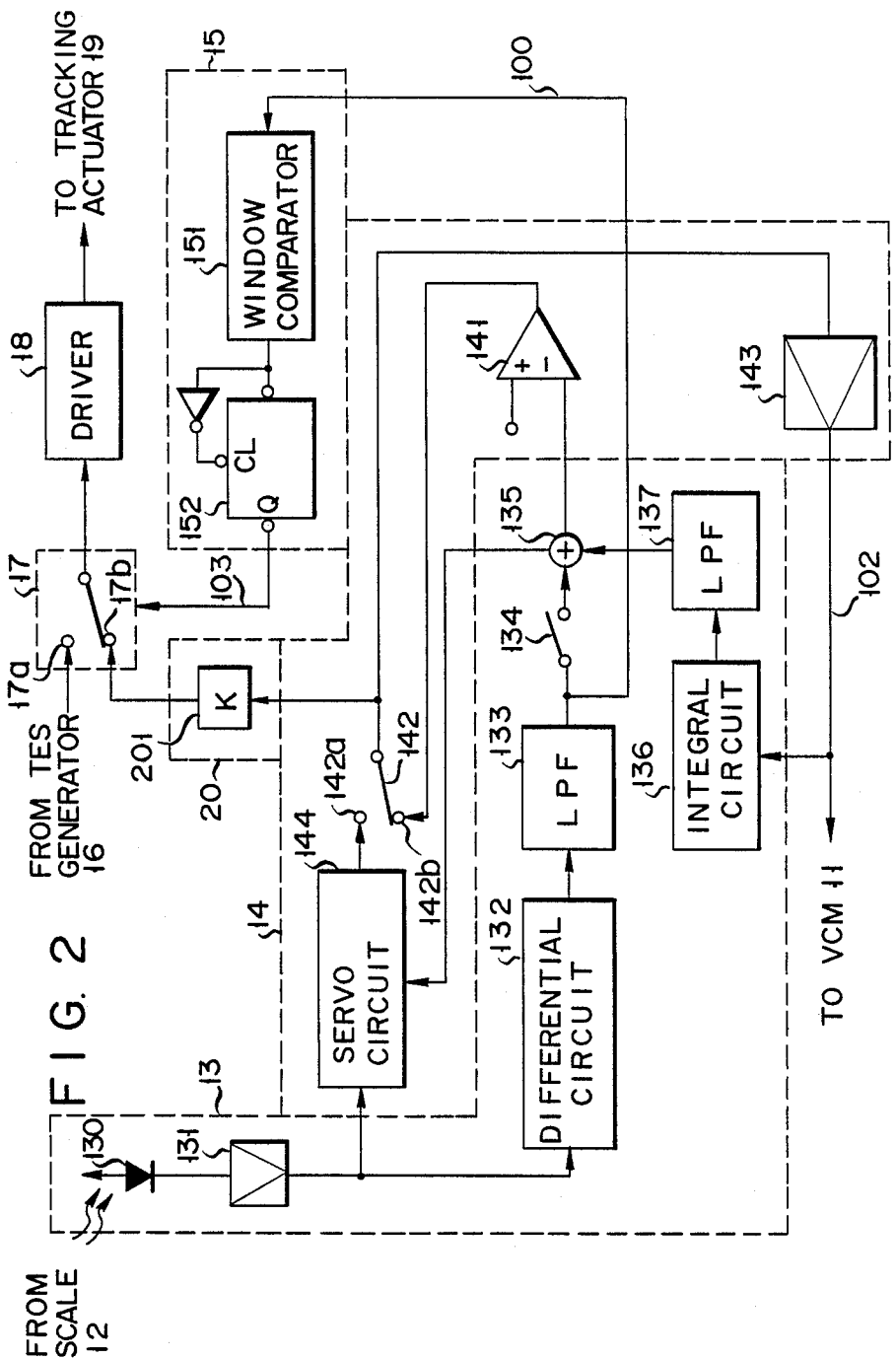
FIG. 2 is a block diagram showing a main part of the first embodiment in detail.

FIG. 2 is a block diagram showing detector 13, driver 14, and generator 20 shown in FIG. 1 in detail, and for representing the generation of the lens damping signal.

Detector 13 emits detection light onto scale 12, and receives the light reflected thereby, in order to read its grating pattern. In detector 13, the light reflected by scale 12 is incident on photodiode 130. The output from photodiode 130 is amplified by amplifier 131 and is output as the location signal.

The location signal is supplied to differential circuit 132 and also to location servo circuit 144 in driver 14. The output signal from circuit 132 is output as velocity signal 100 through LPF 133 and is supplied to controller 15. At the same time, signal 100 is supplied to the first input terminal of mixer 135, through switch 134. VCM drive signal 102, which is output from driver 14 to VCM 11, is also supplied to the second input terminal of mixer 135, through integral circuit 136 and LPF 137. Since signal 102 corresponds to the acceleration of carriage 10, the signal output from circuit 136 corresponds to the velocity signal representing the velocity of carriage 10. Mixer 135 mixes the differentiated location detection signal, and the integrated acceleration signal from circuit 136, and outputs the sum signal as an actual velocity signal.

The sum signal of the differentiated signal of the location detection signal and the integrated signal of signal 102 is used as the actual velocity signal for the following reason: The differentiated signal of the location detection signal, which is detected at an intermediate portion of adjacent tracks, is non-linear. The integrated signal of signal 102 can have an error caused by an external influence. Therefore, the two signals are added to minimize the above errors.

Switch 134 is controlled by controller 15.

The output signal (velocity signal) of mixer 135 is supplied to location servo circuit 144 in driver 14, and to the (−) input terminal of differential amplifier 141.

A location control signal is output from servo circuit 144 in order to location-control VCM 11, so that carriage 10 is returned to the correct location when deviated from a predetermined location.

Velocity-designating analog signal Ain is supplied to the (+) input terminal of amplifier 141 from controller 15. Amplifier 141 outputs a velocity control signal for matching velocity-designating analog signal Ain with the actual velocity signal.

The outputs from servo circuit 144 and amplifier 141 are input to first and second input terminals 142a and 142b of selector 142, respectively. Selector 142 is also controlled by controller 15.

The output from selector 142 is supplied as VCM drive signal 102 to VCM 11, through amplifier 143. The output from selector 142 is also supplied to lens damping signal generator 20. In other words, the location control signal output from servo circuit 144 or the velocity control signal output from amplifier 141 is supplied to generator 20.

Generator 20 has attenuator 201. The operation of attenuator 201 will be described later.

In controller 15, velocity signal 100 supplied thereto is input to window comparator 151. The output of comparator 151 is supplied to selector 17 as lens damping control signal 103, through retriggerable multivibrator 152.

The track access operation of the first embodiment will now be described with reference to FIGS. 3A to 3D. The access control operation of this embodiment consists of a carriage velocity control operation and a carriage location control operation.

When access command 101, shown in FIG. 3A, is supplied to controller 15, controller 15 switches selector 142 to the second input terminal 142b and closes switch 134. At the same time, controller 15 supplies to the (+) input terminal of differential amplifier 141, velocity-designating signal Ain which controls the velocity of carriage 10 in accordance with the difference between the current carriage location (track address) and a target track address. The (−) input terminal of amplifier 141 receives an actual velocity signal output (in this case, an output from differential circuit 132 plus an output from integral circuit 136, since switch 134 is closed) from mixer 135.

Amplifier 141 outputs a velocity control signal in accordance with the difference between signal Ain and the actual velocity signal. The velocity control signal is supplied to amplifier 143 through second terminal 142b of selector 142, is amplified thereby, and is supplied to VCM 11 as VCM drive signal 102, so that VCM 11 performs velocity control. This operation mode will be referred to as a velocity control mode hereinafter.

In the initial state, since carriage 10 is stationary and the actual velocity signal is thus 0, the output signal of amplifier 141 rises quickly. VCM drive signal 102, output from amplifier 143, is shown in FIG. 3B, and velocity signal 100, output from differential circuit 132, is shown in FIG. 3C.

Controller 15 compares signal 100 from differential circuit 132 with first and second reference values (indicated by alternate long and short dashed lines in FIG. 3C). When the velocity signal does not fall within the first or second reference values, controller 15 outputs a detection signal to retriggerable multivibrator 152.

Therefore, during the carriage velocity control mode, lens damping control signal 103 is at "1" level, as shown in FIG. 3D.

Selector 17 is switched to the second terminal 17b upon reception of signal 103 of "1" level. A drive current from selector 142 to VCM 11 is supplied to second terminal 17b of selector 17 as a lens damping signal, through attenuator 201. Thereafter, during velocity control of carriage 10, objective lens 8 is controlled by the lens damping signal corresponding to the drive current to VCM 11.

The lens damping signal will now be described. Acceleration α1 of carriage 10 can be expressed as:

$$\alpha 1 = (B1l1/m1)i1 \quad (1)$$

where i1 is VCM drive signal 102, m1 is the mass of carriage 10, B1 is a magnetic flux density, and l1 is the length of the drive coil of VCM 11.

Acceleration α2 acting on objective lens 8 when carriage 10 shifts abruptly is expressed as:

$$\alpha 2 = \alpha 1 \quad (2)$$

Drive current i2 of lens tracking actuator 19 for stopping objective lens 8 regardless of shifting of carriage 10 is expressed as:

$$i2 = (m2/B2l2)\alpha 2 \quad (3)$$

where m2 is the mass of lens 8, B2 is a magnetic flux density, and l2 is the length of lens tracking actuator 19.

From equations (1) to (3), i2 can be given as:

$$i2 = (B1l1/B2l2)(m2/m1)i1 \quad (4)$$

Therefore, drive current i2 for lens tracking actuator 19 for stopping objective lens 8 regardless of shifting of carriage 10 can be calculated from VCM drive signal 102 when constant K of attenuator 201 is set as:

$$K = i2/i1 = (B1l1/B2l2)(m2/m1) \quad (5)$$

When lens tracking driver 18 is driven at a constant voltage, since V2 = R2i2, constant K' is expressed as:

$$K' = R2(B1l1/B2l2)(m2/m1) \quad (6)$$

where R2 is the resistance of tracking actuator 19.

During carriage velocity control, lens damping signal i2 as described above, is supplied to tracking actuator 19. Therefore, objective lens 8 does not vibrate, even if the acceleration force of carriage 10 acts thereon.

When the generation of VCM drive signal 102 ceases, i.e., when a negative pulse is generated, controller 15 detects the trailing edge of the negative pulse and switches selector 142 to the first input terminal 142a. Thus, the output (location control signal) from location servo circuit 144 is supplied to VCM 11 through selector 142 and amplifier 143, as well as to lens-tracking driver 18, attenuator 201, and selector 17. Servo circuit 144 generates a location control signal for holding carriage 10 at a predetermined location, so as to prevent it being deviated from its stop position by external vibration or the like. More specifically, when selector 142 is switched to first terminal 142a, the carriage control mode is switched from the velocity control mode to the location control mode. Thereafter, a location control signal is changed to a lens damping signal. During this mode, constant K of attenuator 201 is also expressed by equations (5) and (6).

In the location control mode, signal 100 starts converging, as shown in FIG. 3C. Upon comparison with the first and second reference values, when signal 100 lies between the two, generation of the detection pulse signal ceases and triggering of retriggerable multivibrator 152 ends. Therefore, after having converged between the first and second reference values, if signal 100 does not vary to have a value other than that falling between the first and second reference values during the period of time constant T of multivibrator 152, lens damping signal is at "0" level, as shown in FIG. 3D.

For this reason, even when the control mode of carriage 10 is switched from the velocity control mode to the location control mode, the control mode of selector 17, which selectively supplies one of the TES and lens damping signals to objective lens 8, is not switched immediately, but is switched after predetermined period of time t0 elapses. When selector 17 is switched to the first terminal 17a by lens damping control signal 103 of "0" level, the TES signal is supplied to tracking actuator 19, lens damping ceases, and lens tracking is initiated.

In this manner, even when the control mode of carriage 10 is switched from the velocity control mode to the location control mode, the supply of the lens damping signal to objective lens 8 does not cease immediately, but continues for some time t0. As a result, the vibration of objective lens 8, caused by the shifting of carriage 10, can be quickly suppressed.

As described above, according to this embodiment, during accessing, the carriage is first velocity-controlled to a target track, and is then location-controlled. A lens damping signal is generated from a drive signal supplied to the carriage, and is supplied to an objective lens during velocity control and during a predetermined period of time following the velocity control. Therefore, the vibration of the objective lens caused by a force acting thereon, in accordance with the acceleration of the shifting carriage, can be suppressed. An optical recording/reproducing device which can quickly stabilize the access-related movement of the carriage can thus be provided.

FIG. 4 shows a modification of the method for generating lens damping control signal 103 of the above embodiment. In the above embodiment, the duration of the predetermined period of time after the end of shifting of the carriage, is determined by detecting the degree of convergence of the velocity signal. However, according to this modification, the predetermined period of time can be set using one-shot multivibrator 154. More specifically, control signal 104 for selector 142 for setting the carriage in the velocity control mode is supplied to the first input terminal of OR gate 153, as well as to the second input terminal of OR gate 153, through one-shot multivibrator 154. With this method, the lens damping signal is supplied to lens tacking actuator 19 through selector 17 for a period of time corresponding to the duration of the carriage velocity control mode plus the duration of the time constant of multivibrator 154.

The present invention is not limited to the above embodiment, but various changes and modifications may be made within the spirit and scope thereof. Although the recording medium is a disk in the above description, it can have a rectangular card-like shape or a cylindrical drum-like shape. Although an optical linear scale is employed as a scale for detecting the degree of shift of the carriage, a rotary encoder or the like can be employed instead. Although the lens damping signal is calculated, in this instance from the carriage velocity signal, it can also be calculated, in this instance, from a carriage acceleration signal.

As described above, according to the present invention, during the carriage velocity control mode, a lens damping signal corresponding to a velocity control signal is supplied to an objective lens and, during a predetermined period of time after the carriage control mode is switched from the velocity control mode to the location control mode, a lens damping signal corresponding to a location control signal is supplied to the objective lens. As a result, since the supply of the lens damping signal to the objective lens does not cease immediately after the carriage control mode is switched from the velocity control mode to the location control mode, but continues for some time, the vibration of the objective lens, caused by shifting of the carriage, can be quickly suppressed.

What is claimed is:

1. An optical recording/reproducing device, for use with an optical disk having a plurality of tracks thereon, comprising:
    pickup means including a laser light source; a shiftable lens means arranged for irradiating an optical disk with a laser light beam from said laser light source; and lens actuator means for moving an optical axis of said lens means and for tracking said optical disk with said laser light beam;
    access means including means for shifting said pickup means in a radial direction of said optical disk in response to an access command; and means for locating said pickup means on a predetermined track on said optical disk; and
    lens damping means for supplying to said lens actuator means, a lens damping signal which attenuates vibration of said lens means caused by a force acting thereon in accordance with acceleration of said pickup means, said lens damping signal being supplied during shifting of said pickup means and during a predetermined period of time after shifting of said pickup means;
    said lens damping means comprising gate means for supplying selectively said lens damping signal and a trucking error signal to said lens actuator means.

2. The optical recording/reproducing device of claim 1, wherein:
    said access means includes means for generating a drive signal for shifting said pickup means in said radial direction; and
    said lens damping means includes means for generating said lens damping signal corresponding to said drive signal.

3. The optical recording/reproducing device of claim 1, wherein:
    said access means includes;
        means settable in a velocity control mode in response to an access command, for controlling a shift speed of said pickup means in accordance with a velocity control signal corresponding to a distance between a target and a current track;
        means settable in a location control mode responsive to ceasing of generation of said velocity control signal and, responsive to said pickup means being deviated from said target track, for returning said pickup means to said target track in accordance with a location control signal and the deviation thereof; and
    said lens damping means includes;
        means for generating said lens damping signal in response to said velocity control signal while said access means is in the velocity control mode; and
        means for generating said lens damping signal in responsive to a location control signal during a predetermined period of time after commencing of the location control.

4. The optical recording/reproducing device of claim 3, wherein said lens damping means includes means for stopping generation of said lens damping signal when said access means is set in said location control mode and the velocity of said pickup means is below a predetermined value.

5. The device of claim 3, wherein said velocity control signal comprises a signal representing the distance between a target track and a current track.

6. An optical recording/reproducing device, for use with an optical type recording medium having recording tracks defined thereon, comprising:
    pickup means including:
        a laser light source for emitting a laser beam;
        lens means having an optical axis and including an objective lens arranged for shifting movement for irradiating an optical type recording medium with the laser light beam from said laser light source; and
        lens actuator means for moving the optical axis of said lens means and for tracking said optical type recording medium with said laser light beam;
    access means including:
        means for shifting said pickup means in a radial direction relative to the tracks of said optical type recording medium in response to an access command, and for locating said pickup means on a predetermined track on said optical type recording medium;
        detector means arranged separately from said pickup means, for detecting the location and velocity of said pickup means including said lens means with respect to said recording medium, and for generating a corresponding location control signal and a corresponding velocity control signal;
        means settable in a velocity control mode in response to said access command, for controlling a shift speed of said pickup means in accordance with said velocity control signal; and
        means settable in a location control mode responsive to ceasing of generation of said velocity control signal, for returning said pickup means to a target track in accordance with said location control signal, when said pickup means is deviated from a target track; and
    lens damping means for supplying, to said lens actuator means of said pickup means, a lens damping signal which attenuates vibration of said objective lens caused by a force acting thereon upon acceleration of said picking means, said lens damping signal being supplied during shifting of said pickup means and during a predetermined period of time after shifting of said pickup means,
    said lens damping means generating said lens damping signal in response to said velocity control signal while said access means is in said velocity control mode, and generating said lens damping signal in response to said location control signal during a predetermined period of time after commencing of the location control mode.

7. The device of claim 6, wherein said velocity control signal comprises a signal representing the distance between a target track and a current track.

8. The optical recording/reproducing device of claim 6, wherein said lens damping means includes means for stopping generation of said lens damping signal when said access means is set in said location control mode and the velocity of said pickup means is below a predetermined value.

9. The optical recording/reproducing device of claim 6, wherein said lens damping means comprises gate means for selectively supplying said lens damping signal and a tracking error signal to said lens actuator means.

10. The optical recording/reproducing device of claim 8, wherein said lens damping means comprises gate means for selectively supplying said lens damping signal and a tracking error signal to said lens actuator means.

* * * * *